United States Patent

Iizuka

[19]

[11] Patent Number: 5,885,188
[45] Date of Patent: Mar. 23, 1999

[54] SHIFT CONTROL METHOD FOR AUTOMATIC TRANSMISSION AND SYSTEM THEREFOR

[75] Inventor: Naonori Iizuka, Fuji, Japan

[73] Assignee: Jatco Corporation, Fuji, Japan

[21] Appl. No.: 934,673

[22] Filed: Sep. 22, 1997

[30] Foreign Application Priority Data

Sep. 30, 1996 [JP] Japan .................................. 8-259734

[51] Int. Cl.⁶ .................................................. F16H 61/04
[52] U.S. Cl. ........................... 477/121; 477/154; 701/59
[58] Field of Search ............................ 477/98, 154, 158, 477/121; 74/335; 701/59, 52

[56] References Cited

U.S. PATENT DOCUMENTS

| | | | |
|---|---|---|---|
| 5,127,288 | 7/1992 | Hojo et al. | 701/52 X |
| 5,157,989 | 10/1992 | Asada | 477/115 |
| 5,269,204 | 12/1993 | Moroto et al. | 477/131 |
| 5,393,275 | 2/1995 | Okada et al. | 701/52 X |
| 5,393,277 | 2/1995 | White et al. | 477/108 |
| 5,401,223 | 3/1995 | White et al. | 477/108 |

FOREIGN PATENT DOCUMENTS 63-92863  4/1988  Japan .
1-169164  7/1989  Japan .
5-332437  12/1993  Japan .

*Primary Examiner*—Dirk Wright
*Assistant Examiner*—Peter T. Kwon
*Attorney, Agent, or Firm*—Foley & Lardner

[57] ABSTRACT

A method and system for controlling shift in an automatic transmission that can establish a plurality of gear ratios by selectively supplying a hydraulic pressure for a plurality of frictional engaging elements. The shift control system for the automatic transmission includes a device for selecting either an automatic shifting mode, in which predetermined gear ratios are established depending upon a vehicle driving condition, or a manual shifting mode, in which predetermined gear ratios are established by manual operation; a learning control unit for optimizing hydraulic pressure for the frictional engaging elements on the basis of an actual shifting condition; a learning control inhibiting unit for inhibiting learning control by the learning control unit when the manual shifting mode is selected; and a learning control inhibiting release unit that enables learning control by the learning control unit and disables inhibition of learning control by the learning control inhibiting unit when a shifting operation in the manual shifting mode is taken place under a vehicle driving condition falling within a predetermined zone. The invention prevents increasing of shift shock in the manual shifting mode without using RAM having large capacity.

12 Claims, 4 Drawing Sheets

SHIFT CONTROL METHOD FOR AUTOMATIC TRANSMISSION AND SYSTEM THEREFOR

BACKGROUND OF THE INVENTION

Field of the Invention

The present invention relates to a shift controlling method for an automatic transmission and a system therefor.

In an automatic transmission which can establish a plurality of gear ratios by selectively supply hydraulic pressure to a plurality of friction engagement elements, there has been known the automatic transmission, in which either an automatic shifting mode to automatically establish a predetermined gear ratio from a preliminarily set map of shifting range on the basis of a vehicle driving condition, such as an engine load represented by a throttle opening, and a vehicle speed, or a manual shifting mode, in which the driver establishes a desired gear ratio by manual operation, can be selected.

In order to prevent shift shock from increasing due to fluctuation of shifting performance of respective individual automatic transmissions due to tolerance in spool valves, springs and so on, for selectively supplying a hydraulic pressure to the friction engagement elements, or secular change of the friction engagement elements, Japanese Patent Application Laid-open No. 63-92863 (1988) and Japanese Patent Application Laid-open No. 1-169164 (1989) disclose system which performs learning control so that an actual shifting period converges to a targeted shifting period to from initiation of shifting to completion of shifting. In the learning control of the shifting period, the target sifting period and the actual shifting period are compared to correct a hydraulic pressure value preliminarily stored in a map or the like to output the corrected hydraulic pressure upon next shifting so as to converge the actual shifting period to the target shifting period.

When the learning control of the shifting period is performed in the automatic shifting mode, since the vehicle driving conditions to cause shifting operation are determined univocally, required storage capacity of RAM to be used for storing the content of learning is relatively small. However, when learning control of the shifting period is attempted during manual shifting mode, huge amount of storage capacity is required for RAM to be used since shifting operation tends to be performed in arbitrary vehicle driving condition and all vehicle driving conditions where the manual shifting operation is taken place. Furthermore, control logic becomes too complicate.

In order to avoid such problem, in the conventional shift control system for an automatic transmission, as disclosed in Japanese Patent Application Laid-open No. 5-332437 (1993), learning control of the shifting period is inhibited while manual shifting mode is selected to simplify control logic to permit use of RAM having small storage capacity.

In case of the conventional shift control system of the automatic transmission disclosed in Japanese Patent Application Laid-open No. 5-332437, if automatic shifting mode is rarely selected and manual shifting mode is continuously used for a long period, learning control of the shifting period is substantially not performed. As a result, it becomes impossible to prevent increasing of shift shock or degradation of durability of the frictional engaging elements.

The foregoing problem will not be happened when a proportion of driving of the vehicle in the automatic shifting mode is sufficiently large and when manual shifting mode is selected for a short period.

SUMMARY OF THE INVENTION

It is an object of the present invention to provide a shift control for an automatic transmission and a system therefor, which can reduce shift shock even in manual shifting mode without using RAM having large storage capacity.

According to the first aspect of the present invention, a shift control method for an automatic transmission which can establish a plurality of gear ratios by selectively supplying hydraulic pressure to a plurality of frictional engaging elements, comprising:

step of selecting either an automatic shifting mode, in which predetermined gear ratios are established depending upon a vehicle driving condition, or a manual shifting mode, in which predetermined gear ratios are established by manual operation;

learning control step of optimizing hydraulic pressure for the frictional engaging elements on the basis of an actual shifting condition;

learning control inhibiting step of inhibiting the learning control step when the manual shifting mode is selected; and learning control inhibiting release step of enabling the learning control step and disabling the learning control inhibiting step when a shifting operation in the manual shifting mode is taken place under a vehicle driving condition falling with a predetermined zone.

According to the present invention, either the automatic shifting mode, in which predetermined gear ratios are established depending upon a vehicle driving condition, or a manual shifting mode, in which predetermined gear ratios are established by manual operation, is selected.

When the automatic shifting mode is selected, the predetermined gear ratios are established by selectively supplying hydraulic pressure for a plurality of frictional engaging elements depending upon the vehicle driving condition. At this time, the learning control step is executed for optimizing the hydraulic pressure to the frictional engaging elements on the basis of the actual shifting condition.

When the manual shifting mode is selected, the hydraulic pressure is selectively supplied to a plurality of frictional engaging elements to establish predetermined gear ratios by manual operation. At this time, the learning control step is inhibited. However, when the shifting operation in the manual shifting mode is taken place in the vehicle driving condition falling within a predetermined zone, the learning control inhibiting step is not performed and learning control step is performed for optimizing the hydraulic pressure to the frictional engaging elements on the basis of the actual shifting condition.

In the shift control method for an automatic transmission according to the first aspect of the present invention, the vehicle driving condition may be represented by a vehicle speed and a throttle opening.

The learning control step may optimize hydraulic pressure to the frictional engaging elements for converging an actual shifting period from initiation of shifting to completion of shifting to a target shifting period.

The learning control inhibiting step may inhibit learning control step when a fluid temperature of an automatic transmission fluid is lower than or equal to a predetermined temperature or a throttle opening is less than or equal to a predetermined opening.

The learning control inhibiting release step may enable the learning control step and disable the learning control inhibiting step when an up-shifting operation in the manual shifting mode is taken place under a vehicle driving condition falling with a predetermined zone.

The predetermined zone may be a range substantially corresponding to a range where shifting operation is to be performed in the automatic shifting mode.

According to the second aspect of the present invention, a shift control system for an automatic transmission which can establish a plurality of gear ratios by selectively supplying hydraulic pressure to a plurality of frictional engaging elements, comprising:

means for selecting either an automatic shifting mode, in which predetermined gear ratios are established depending upon a vehicle driving condition, or a manual shifting mode, in which predetermined gear ratios are established by manual operation;

learning control means for optimizing hydraulic pressure for the frictional engaging elements on the basis of an actual shifting condition;

learning control inhibiting means for inhibiting learning control by the learning control means when the manual shifting mode is selected; and learning control inhibiting release means for enabling learning control by the learning control means and disabling inhibition of learning control by the learning control inhibiting means when a shifting operation in the manual shifting mode is taken place under a vehicle driving condition falling with a predetermined zone.

According to the present invention, either the automatic shifting mode, in which predetermined gear ratios are established depending upon a vehicle driving condition, or a manual shifting mode, in which predetermined gear ratios are established by manual operation, is selected by the selecting means.

When the automatic shifting mode is selected, the predetermined gear ratios are established by selectively supplying hydraulic pressure for a plurality of frictional engaging elements depending upon the vehicle driving condition. At this time, the learning control means is executed for optimizing the hydraulic pressure to the frictional engaging elements on the basis of the actual shifting condition.

When the manual shifting mode is selected, the hydraulic pressure is selectively supplied to a plurality of frictional engaging elements to establish predetermined gear ratios by manual operation. At this time, the learning control inhibiting means inhibits learning control by the learning control means. However, when the shifting operation in the manual shifting mode is taken place in the vehicle driving condition falling within a predetermined range, the learning control inhibiting means is not inhibited learning control by the learning control inhibiting lerease means, and learning control means is learning control for optimizing the hydraulic pressure to the frictional engaging elements on the basis of the actual shifting condition.

In the shift control system for an automatic transmission according to the second aspect of the present invention, the vehicle driving condition may be represented by a vehicle speed and a throttle opening.

The learning control means may optimize hydraulic pressure to the frictional engaging elements for converging an actual shifting period from initiation of shifting to completion of shifting to a target shifting period.

The learning control inhibiting means may inhibit learning control by the learning control means when a fluid temperature of an automatic transmission fluid is lower than or equal to a predetermined temperature or a throttle opening is less than or equal to a predetermined opening.

The learning control inhibiting release means may enable learning control by the learning control means and disable inhibition of learning control by the learning control inhibiting means when an upshifting operation in the manual shifting mode is taken place under a vehicle driving condition falling with a predetermined zone.

The predetermined zone may be a range substantially corresponding to a range where shifting operation is to be performed in the automatic shifting mode.

According to the present invention, when shifting operation in the manual mode is performed in the vehicle driving condition falling in the predetermined zone where automatic shifting operation is performed when the automatic shifting mode is selected, learning control of the shifting period is performed. Therefore, even when vehicle is driven in manual shifting mode for a long period, increasing of shift sock lowering of durability of the frictional engaging elements can be successfully restricted.

In order to increase number of times of learning control of the shifting period, immediately returning from the manual shifting mode to the automatic shifting mode, where the hydraulic pressure to be supplied to the frictional engaging elements is out of the optimal value, it can be converged to the optimal value within a short period to make shift shock small.

DETAILED DESCRIPTION OF THE PREFERRED EMBODIMENT

While the present invention will be explained in detail hereinafter in terms of one embodiment as applied to an automatic transmission with forward four speeds of gear ratios, with reference to FIGS. 1 to 3, the present invention is applicable for any automatic transmission which can establish a plurality of gear ratios by selectively supplying hydraulic pressure for a plurality of frictional engaging elements.

Figure 1:
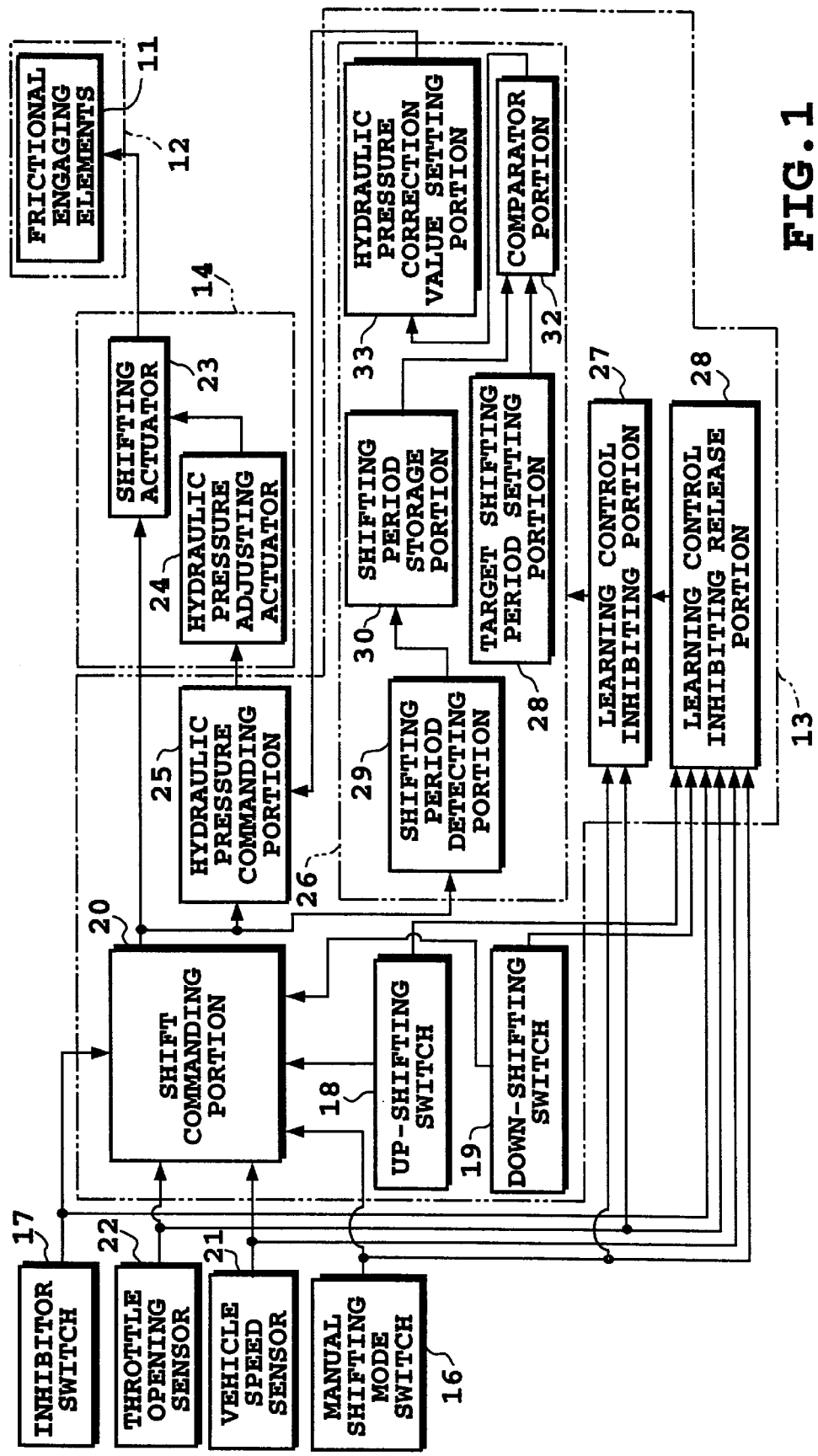
FIG. 1 is a block diagram showing one embodiment of a shift control system for an automatic transmission according to the present invention.

General construction of the preferred embodiment is illustrated in FIG. 1. An automatic transmission 12 having a plurality of frictional engaging elements 11 is designed to establish a desired gear ratio via a hydraulic pressure control unit 14 on the basis of a command from CPU 13. The automatic transmission 12 has an automatic shifting mode to automatically establishing predetermined gear ratios on the basis of vehicle driving conditions and a manual shifting mode, in which desired gear ratios in response to manual shifting operation of a driver through a selector lever (see FIG. 2).

Figure 2:
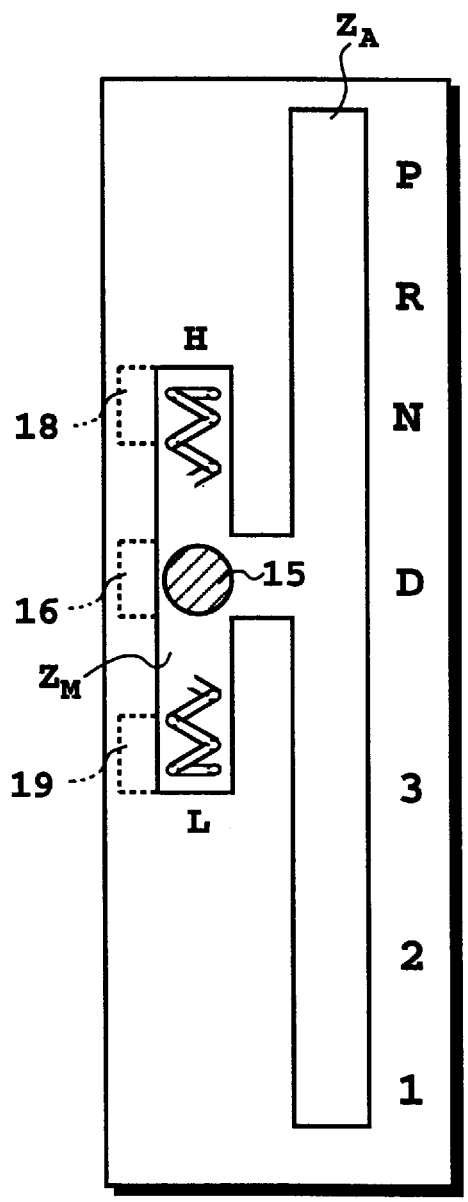
FIG. 2 is a conceptual illustration showing shift mode pattern of a selector lever in the embodiment of FIG. 1.

A shifting mode pattern in the shown embodiment is illustrated in FIG. 2. The selector lever 15 can be shifted to an automatic shifting mode range $Z_A$ and a manual shifting mode range $Z_M$ connected to the automatic shifting mode range $Z_A$. Whether the selector lever 15 is in the manual shifting mode range $Z_M$ or not is detected by a manual shifting mode switch 16.

In the automatic shifting mode range $Z_A$, select positions of P, R, N, D, 3, 2 and 1 are set. P range is a position where an output shaft of the automatic transmission is mechanically locked at neutral position. R range is the position to select for reverse drive position. N range is the position to select neutral position. D range is the position for automatic shifting between first to fourth gear ratios, 3 range is the position for automatic shifting between first to third speed ratios, 2 range is the position for automatic shifting between first and second speed ranges, and 1 range is the position for holding the first speed ratio. The select position of the selector lever 15 in the automatic shifting mode range $Z_A$, is detected by an inhibitor switch 17.

In the manual shifting mode range $Z_M$, the selector lever 15 is biased to the neutral position by a spring force as shown in FIG. 2. At the shifting end of the selector lever 15 in the manual shifting mode range $Z_M$, an up-shifting switch 18 and a down-shifting switch 19 are combined. Every time of shifting the selector lever 15 toward higher (H) range side, namely up-shifting switch 18 is depressed, up-shifting operation is performed up to the fourth speed ratio. Conversely, every time of down-shifting toward lower (L) speed range side, namely down shifting switch 19 is depressed. down-shifting operation is performed up to the first speed ratio.

In the shown embodiment, a shifting mode pattern is separated between the automatic shifting mode range $Z_A$ and the manual shifting mode range $Z_M$. However, the select position of the selector lever 15 may be assumed to be P, R, N, D and T, and an up-shifting switch and a down-shifting switch for manual shifting operation are built-in a not shown steering wheel and so on. Thereby, when the selector lever is in T range, manual up-shifting and down-shifting operation can be performed by operating the up-shifting switch and the down-shifting switch for enabling shifting operation.

To a shift commanding portion 20 included in CPU 13, ON/OFF signals of the manual mode switch 16, the up-shifting switch 18 and the down-shifting switch 19, detection signals from various sensors for detecting the driving condition of the vehicle, such as those from a vehicle speed sensor 21, a throttle opening sensor 22 as an engine load sensor, and a detection signal from the inhibitor switch 17 are input. When the driver shifts the selector lever 15 into the manual shifting mode range $Z_M$, the manual mode switch 16 is turned ON. Thus, manual shifting mode is selected. Conversely, when the selector lever 15 is shifted to the automatic shifting mode range $Z_A$, the manual mode switch 16 is turned OFF. Thus, automatic shifting mode is selected.

Figure 3:
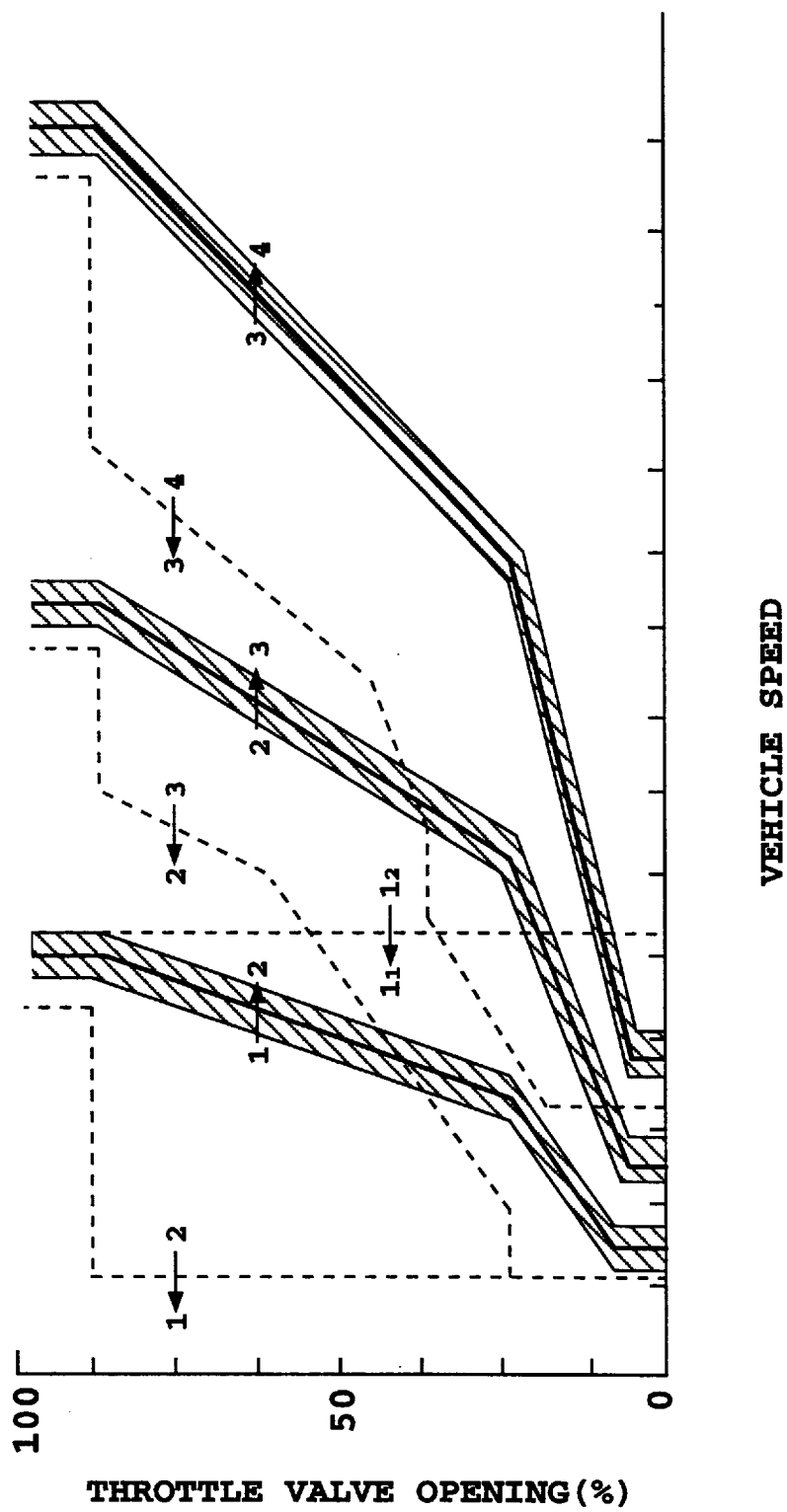
FIG. 3 is a shift map in the embodiment of FIG. 1.

In the shift commanding portion 20 of CPU 13, a shift map for automatic shifting mode, as shown in FIG. 3, setting predetermined shifting ranges depending upon a vehicle speed and a throttle opening, is stored. When the automatic shifting mode is selected, predetermined gear ratios are automatically established according to the shift map of FIG. 3 on the basis of the vehicle speed and the throttle opening. In FIG. 3, a solid line shows the case of up-shifting, and a broken line shows the case of down-shifting. A down-shifting line $1_1 \leftarrow 1_2$ represents a shifting boundary to actually cause shifting from second gear ratio to first gear ratio when the shifting range before shifting operation is second or higher gear ratio and when the selector lever 15 is shifted into 1 range.

The hydraulic pressure control unit 14 includes a shifting actuator 23 for selectively supplying hydraulic pressure for a plurality of frictional engaging elements 11 on the basis of the command from the shift commanding portion 20 and a hydraulic pressure adjusting actuator 24 for controlling the hydraulic pressure to be supplied to predetermined frictional engaging elements 11 via the shifting actuator 23. The hydraulic pressure adjusting actuator 24 performs control for optimizing the hydraulic pressure to be supplied to the frictional engaging elements 11 on the basis of a command from a hydraulic pressure commanding portion 25 included in CPU 13. Specifically, the hydraulic pressure adjusting actuator 24 corrects a predetermined basic hydraulic pressure value with a hydraulic pressure correction value from a hydraulic pressure correction value setting portion 33 depending upon the throttle opening and type of shifting, namely relationship between the gear ratios before shifting and that to shifting. Thus, the optimal hydraulic pressure value to be supplied to the frictional engaging element 11 is set by the hydraulic pressure commanding portion 25.

In CPU 13, a learning control portion 26 for optimizing the hydraulic pressure to be adjusted the hydraulic pressure adjusting actuator 24 on the basis of actual shifting condition, a learning inhibiting portion 27 for inhibiting learning control by the learning control portion 26 when the manual shifting mode is select, a leaning control inhibiting release portion 28 for disabling inhibition of learning control by the leaning control inhibiting portion 27 only when the shifting operation in the manual shifting mode is taken place at the vehicle driving condition within a predetermined zone. Therefore, to the learning control inhibiting portion 27 and the learning control inhibiting release portion 28, the ON/OFF signal is output from the manual shifting mode switch 16. Also, to the learning control inhibiting release portion 28, the signals from the up-shifting switch 18, the down-shifting switch 19, the vehicle speed sensor 21, the throttle opening sensor 22 and the inhibitor switch 17 are input.

The learning control portion 26 includes a shifting period detecting portion 29 for counting a time from initiation of shifting to completion of shifting, a shifting period storage portion 30 for temporarily storing an actual shifting period detected by the shifting period detecting portion 29, a target shifting period setting portion 31 for preliminarily setting a target shifting period on the basis of a predetermined driving condition of the vehicle, a comparator portion 32 for deriving a difference between the target shifting period and the actual shifting period by comparing the actual shifting period stored in the shifting period storage portion 30 and the target shifting period read out from the target shifting period setting portion 31, and s hydraulic pressure correction value setting portion 33 for correcting the hydraulic pressure value output from the hydraulic pressure commanding portion 25 depending upon the time difference derived by the comparator portion 32. The hydraulic pressure correction value from the hydraulic pressure correction value setting portion 33 is output to the hydraulic pressure commanding portion 25.

In the shown embodiment, even when the automatic shifting mode is selected, if a fluid temperature of the automatic transmission fluid is lower than or equal to a predetermined temperature, e.g. 40° C., or if the throttle opening is less than or equal to a predetermined value, e.g. 10%, learning control is not performed in view of stability of control. Therefore, detected information from the fluid temperature sensor, the throttle opening sensor 22 and so on are also input to the learning control inhibiting release portion 28 and the learning control inhibiting portion 27. Irrespective of the automatic shifting mode and the manual shifting mode, if the fluid temperature of the automatic transmission fluid is lower than or equal to the predetermined temperature, or if the throttle opening is less than or equal to the predetermined opening, learning control by the learning control portion 26 is inhibited.

When a signal for inhibiting learning control is output from the learning control inhibiting portion 27 to the learning control portion 26, the shifting period detecting portion 29 does not perform detection of the actual shifting period in the current shifting, the shifting period storage portion 30 maintains the actual shifting period stored in the preceding occurrence of shifting operation. In such condition, the comparator 31 does not perform comparison of the actual shifting period stored in the preceding occurrence of shifting operation and the target shifting period. Then, the hydraulic pressure correction value setting portion 30 outputs the hydraulic pressure correction value output at the preceding occurrence of shifting operation to the hydraulic pressure commanding portion 25, again. The foregoing predetermined zone in the learning control inhibiting release portion 28, in the shown embodiment, is the case where the driver performs up-shifting operation by shifting the selector lever 15 to the H range side in the hatching region in the vicinity of the up-shifting line shown in FIG. 3 while the manual shifting mode is selected. Namely, when the driver performed up-shifting operation in the hatching region, the learning control inhibiting release portion 28 interrupts output for inhibiting learning control to the learning control portion 26 from the learning control inhibiting portion 27 to perform learning control by the learning control portion 26.

A cross-hatching region formed along the up-shifting line in the automatic shifting mode as shown in FIG. 3, is the range to interrupting output for inhibiting learning to the learning control portion 26 by the learning control inhibiting release portion 28 and thus to perform learning control, in which the hydraulic pressure commanding portion 25 uses the hydraulic pressure correction value output from learning control portion 26. This range is stored in the learning control inhibiting release portion 28 to have different values depending upon type of up-shifting, namely 1–2 shifting, 1–3 shifting, 1–4 shifting, 2–3 shifting, 2–4 shifting and 3–4 shifting. In the shown embodiment, the minimum vehicle speed and the maximum vehicle speed corresponding to each type of up-shifting and the throttle opening are read out from the learning control inhibiting release portion 28 to make judgement whether the vehicle speed falls between the minimum vehicle speed and the maximum vehicle speed. Thus, the learning control inhibiting release portion 28 makes judgement whether the current vehicle driving condition falls within the learning control enabling zone shown by cross-hatching in FIG. 3.

Figure 4:
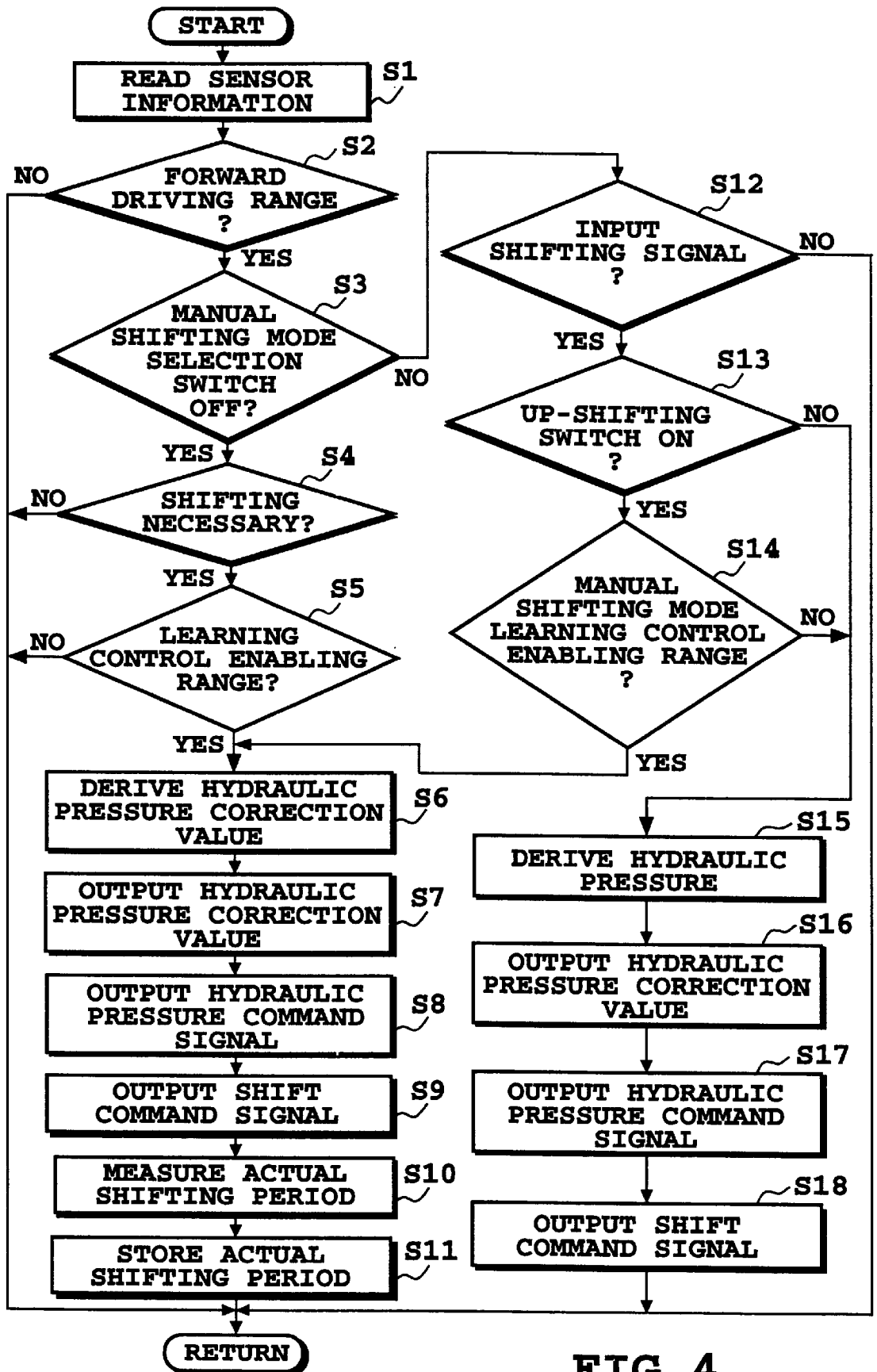
FIG. 4 is a flowchart showing a shifting process in the embodiment shown in FIG. 1.

Flow of process in the shown embodiment is shown in FIG. 4. At step S1, information from the vehicle speed sensor 21 and the throttle opening sensor 22 as vehicle driving condition is read out. At step S2, check is performed whether the selector lever 15 is in D range, 3 range, 2 range, 1 range or the manual shifting mode range $Z_M$, namely forward driving range is selected.

At step S2, if judgment is made that selector lever 15 does not select the forward driving range, the process is returned to a not shown main process, and repeat the process of the step S1. When judgment that the selector lever 15 selects the forward driving range, the process is advanced to step S3 to check whether the manual shifting mode switch 16 is in the OFF condition.

At step S3, if judgment is made that the manual shifting mode switch 15 is in OFF state, namely the automatic shifting mode is selected, the process is advanced to step S4 to make judgment whether shifting is necessary or not on the basis of the shift map of FIG. 3. At step S4, if judgment is made that shifting is not required under the current vehicle driving condition, the process returns to the not shown main process to repeat the process from the step S1. If necessity of shifting is judged at step S4, process is advanced to step S5 to check whether the current vehicle driving condition is in a range where the learning control permitted or not.

If judgment is made that the current vehicle driving condition is not the range where the learning control is permitted at step S5, namely, if the fluid temperature of the automatic transmission fluid is lower than or equal to the predetermined temperature, or if the throttle opening is less than or equal to the predetermined opening and thus stable control cannot be expected, the process returns to the not shown main process, and repeat the process from the step S1. When judgment is made that the current vehicle driving condition is the range where the learning control is permitted at step S5, the process is advanced to step S6 to compare the last actual shifting period and the target shifting period to derive the hydraulic pressure correction value in the learning control portion 26.

Then, at step S7, the hydraulic pressure correction value is output to the hydraulic pressure commanding portion 25. The hydraulic pressure commanding portion 25 derives an optimal hydraulic pressure value on the basis of the hydraulic pressure correction value and the basic hydraulic value to output the hydraulic pressure command signal to the hydraulic pressure adjusting actuator 24 for establishing the optimal hydraulic pressure value, at step S8, and then to output the shifting command signal, at step S9. At step S10, the current actual shifting period is measured. The actual shifting period measured at step S10 is stored at step S11. Then, process is returned to the not shown main process, and repeat the process again from step S1.

When the manual shifting mode switch 16 is not in the OFF state as checked at step S3, namely the manual shifting mode is selected, the process is advanced to step S12 to check whether the up-shifting switch 18 or the down-shifting switch 19 is turned ON or not, namely whether the shifting signal is input to the shifting commanding portion 20 or not. If judgment is made that the up-shifting switch 18 and the down-shifting switch 19 are held OFF, namely the driver does not want to shift the current gear ratio, the process is returned to the not shown main process, and repeat the process again from step S1. If the up-shifting switch 18 or the down-shifting switch 19 is turned ON, namely when the driver wants to cause shifting of the gear ratio from the current gear ratio, check is performed at step S13 whether the current input is ON signal of the up-shifting switch 18 or not.

If judgment is made that the current input is the ON signal of the up-shifting switch 18 at step S13, the process is advanced to step S14 to check whether the current vehicle driving condition falls within the learning control enabling zone of the manual shifting mode as indicated by cross-hatching region in FIG. 3. If judgment is made that the current vehicle driving condition falls within the learning control enabling zone, the process is advanced to step S6 to compare the last actual shifting period and the target shifting period to derive the hydraulic pressure correction value in the learning control portion 26.

If judgment is made that the current vehicle driving condition does not fall within the learning control enabling zone at step S14, or when the current input is not ON signal of the up-shifting switch 18 at step S13, learning control is not performed. Then, the process is advanced to step S15 to read out the hydraulic pressure correction value used in the preceding occurrence of shifting. Then, the read out hydraulic pressure correction value is output to the hydraulic pressure commanding portion 25 at step S16. The hydraulic pressure commanding portion 25 derives an optimal hydraulic pressure value on the basis of the hydraulic pressure correction value and the basic hydraulic value to output the hydraulic pressure command signal to the hydraulic pressure adjusting actuator 24 for establishing the optimal hydraulic pressure value, at step S17, and then to output the shifting command signal, at step S18. Then, process is returned to the not shown main process, and repeat the process again from step S1.

When the selector lever 15 is in the automatic shifting mode range $Z_A$, when shifting operation by the selector lever 15 between 3, 2 and 1 ranges, for example shifting from second gear ratio at 2 range to third gear ratio at 3 range, or from 1 range to second gear ratio at 2 range, is performed in the cross-hatching region formed along the up-shifting line in the manual shifting mode as shown in FIG. 3, learning of the shifting period is performed as a matter of course.

In the shown embodiment, judgment whether the current vehicle driving condition falls within the learning control enabling zone shown by the cross-hatching region in FIG. 3, is made in the learning control inhibiting release portion 28 by reading out the minimum vehicle speed and the maximum vehicle speed corresponding to the type of up-shifting and the throttle opening by the learning control inhibiting release portion 28 and making judgment whether the vehicle speed falls between the minimum vehicle speed and the maximum vehicle speed. However, it is possible to make judgment whether the current vehicle driving condition falls within the learning control enabling zone shown by the cross-hatching region in FIG. 3 by reading out the minimum throttle opening and the maximum throttle opening corresponding to the type of up-shifting and the throttle opening by the learning control inhibiting release portion 28 and making judgment whether the current throttle opening falls between the minimum throttle opening and the maximum throttle opening.

What is claimed is:

1. A shift control method for an automatic transmission which can establish a plurality of gear ratios by selectively supplying hydraulic pressure to a plurality of frictional engaging elements, comprising:

step of selecting either an automatic shifting mode, in which predetermined gear ratios are established depending upon a vehicle driving condition, or a manual shifting mode, in which predetermined gear ratios are established by manual operation;

learning control step of optimizing hydraulic pressure for said frictional engaging elements on the basis of an actual shifting condition;

learning control inhibiting step of inhibiting said learning control step when said manual shifting mode is selected; and learning control inhibiting release step of enabling said learning control step and disabling said learning control inhibiting step when a shifting operation in said manual shifting mode is taken place under a vehicle driving condition falling with a predetermined zone.

2. A shift control method for an automatic transmission as claimed in claim 1, wherein said vehicle driving condition is represented by a vehicle speed and a throttle opening.

3. A shift control method for an automatic transmission as claimed in claim 1, wherein in said learning control step optimizes hydraulic pressure to said frictional engaging elements for converging an actual shifting period from initiation of shifting to completion of shifting to a target shifting period.

4. A shift control method for an automatic transmission as claimed in claim 1, wherein said learning control inhibiting step inhibits learning control step when a fluid temperature of an automatic transmission fluid is lower than or equal to a predetermined temperature or a throttle opening is less than or equal to a predetermined opening.

5. A shift control method for an automatic transmission as claimed in claim 1, wherein said learning control inhibiting release step enables said learning control step and disables said learning control inhibiting step when an up-shifting operation in said manual shifting mode is taken place under a vehicle driving condition falling with a predetermined zone.

6. A shift control method for an automatic transmission as claimed in claim 1, wherein said predetermined zone is a zone substantially corresponding to a zone where shifting operation is to be performed in said automatic shifting mode.

7. A shift control system for an automatic transmission which can establish a plurality of gear ratios by selectively supplying hydraulic pressure to a plurality of frictional engaging elements, comprising:

means for selecting either an automatic shifting mode, in which predetermined gear ratios are established depending upon a vehicle driving condition, or a manual shifting mode, in which predetermined gear ratios are established by manual operation;

learning control means for optimizing hydraulic pressure for said frictional engaging elements on the basis of an actual shifting condition;

learning control inhibiting means for inhibiting learning control by said learning control means when said manual shifting mode is selected; and learning control inhibiting release means for enabling learning control by said learning control means and disabling inhibition of learning control by said learning control inhibiting means when a shifting operation in said manual shifting mode is taken place under a vehicle driving condition falling with a predetermined zone.

8. A shift control system for an automatic transmission as claimed in claim 7, wherein said vehicle driving condition is represented by a vehicle speed and a throttle opening.

9. A shift control system for an automatic transmission as claimed in claim 7, wherein said learning control means optimizes hydraulic pressure to said frictional engaging elements for converging an actual shifting period from initiation of shifting to completion of shifting to a target shifting period.

10. A shift control system for an automatic transmission as claimed in claim 7, wherein said learning control inhibiting means inhibits learning control step when a fluid temperature of an automatic transmission fluid is lower than or equal to a predetermined temperature or a throttle opening is less than or equal to a predetermined opening.

11. A shift control system for an automatic transmission as claimed in claim 7, wherein said learning control inhibiting release means enables said learning control means and disables said learning control inhibiting means when an up-shifting operation in said manual shifting mode is taken place under a vehicle driving condition falling with a predetermined zone.

12. A shift control system for an automatic transmission as claimed in claim 7, wherein said predetermined zone is a zone substantially corresponding to a zone where shifting operation is to be performed in said automatic shifting mode.

* * * * *